(12) United States Patent
Auvenshine et al.

(10) Patent No.: US 7,917,609 B2
(45) Date of Patent: Mar. 29, 2011

(54) METHOD AND APPARATUS FOR MANAGING LIGHTWEIGHT DIRECTORY ACCESS PROTOCOL INFORMATION

(75) Inventors: John Jason Auvenshine, Tucson, AZ (US); Justin C. Blackburn, Surprise, AZ (US); Nicolas Edward Fosdick, Frederick, CO (US)

(73) Assignee: International Business Machines Corporation, Armonk, NY (US)

( * ) Notice: Subject to any disclaimer, the term of this patent is extended or adjusted under 35 U.S.C. 154(b) by 663 days.

(21) Appl. No.: 11/844,668

(22) Filed: Aug. 24, 2007

(65) Prior Publication Data
US 2009/0055518 A1 Feb. 26, 2009

(51) Int. Cl.
*G06F 15/173* (2006.01)
(52) U.S. Cl. .................. 709/223; 709/220; 709/221
(58) Field of Classification Search .......... 709/220–221, 709/223; 707/3, 10, 205, 715, 724, 748
See application file for complete search history.

(56) References Cited

U.S. PATENT DOCUMENTS

| | | | | |
|---|---|---|---|---|
| 6,539,425 B1 * | 3/2003 | Stevens et al. | ............... | 709/220 |
| 6,615,223 B1 * | 9/2003 | Shih et al. | ............... | 707/201 |
| 6,973,463 B2 * | 12/2005 | Merrells et al. | ............... | 707/201 |
| 6,983,288 B1 * | 1/2006 | Kirkwood et al. | ........ | 707/103 R |
| 6,985,905 B2 * | 1/2006 | Prompt et al. | ............... | 707/102 |
| 7,117,221 B2 * | 10/2006 | Hahn et al. | ............... | 707/101 |
| 7,313,598 B1 * | 12/2007 | Sheth | ............... | 709/211 |
| 2003/0018964 A1 | 1/2003 | Fox et al. | | |
| 2003/0145003 A1 | 7/2003 | Yellepeddy et al. | | |
| 2004/0230615 A1 | 11/2004 | Blanco et al. | | |
| 2006/0155777 A1 | 7/2006 | Shih et al. | | |
| 2006/0282482 A1 | 12/2006 | Castro et al. | | |

OTHER PUBLICATIONS

Fan et al., "Optimized Strategies of Grid information Services", Proceedings of the First Internaitonal Conference on Semantics, Knowledge and Grid (SKG 2005), Nov. 2005, pp. 1-3.
Kumar, "Filter Based Directory Replication and Caching", Proceedins of the 21st International Conference on Data Engineering (ICDE 2005) Apr. 2005, pp. 326-327.
Kumar, "Filter Based Directory Replciation: Algorithms and Performance", Proceedings of the 25th IEEE International Conference on Distributed Computing systems (ICSCS'05), Jun. 2005, pp. 586-595.

\* cited by examiner

*Primary Examiner* — Faruk Hamza
(74) *Attorney, Agent, or Firm* — Yee & Associates, P.C.; Arthur J. Samodovitz

(57) ABSTRACT

A computer implemented method, apparatus, and computer usable program code for managing a lightweight directory access protocol environment. A replication hierarchy is identified for a plurality of lightweight directory access protocol servers within the lightweight directory access protocol environment by querying the plurality of lightweight directory access protocol servers for replication information. Environment information is collected for the plurality of lightweight directory access protocol servers using the replication hierarchy, wherein the environment information for the plurality of lightweight directory access protocol servers is used to manage the lightweight directory access protocol environment.

15 Claims, 4 Drawing Sheets

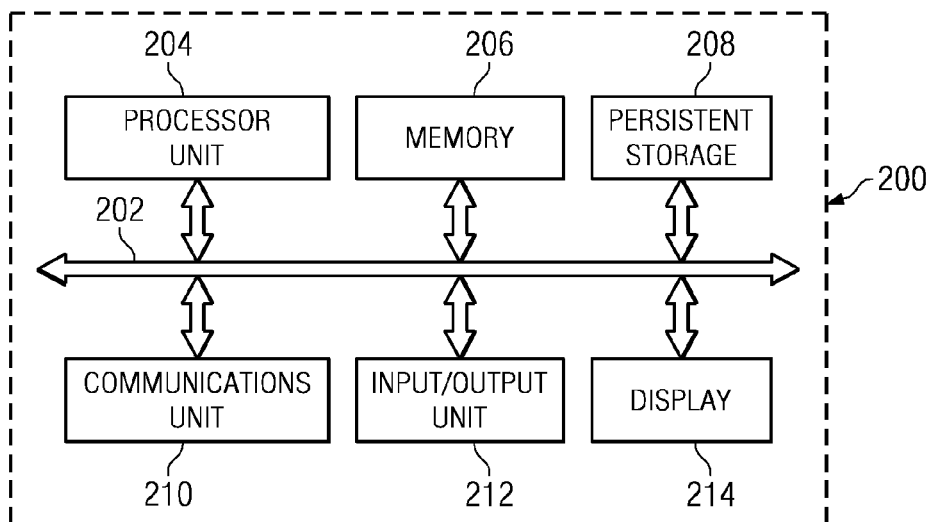
FIG. 2
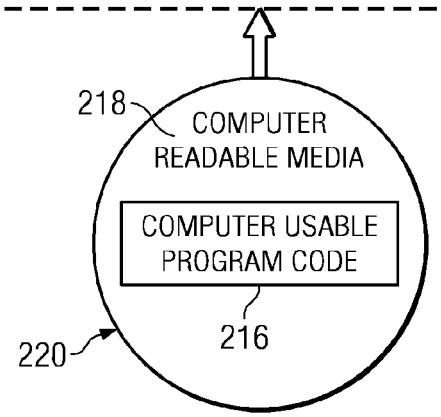
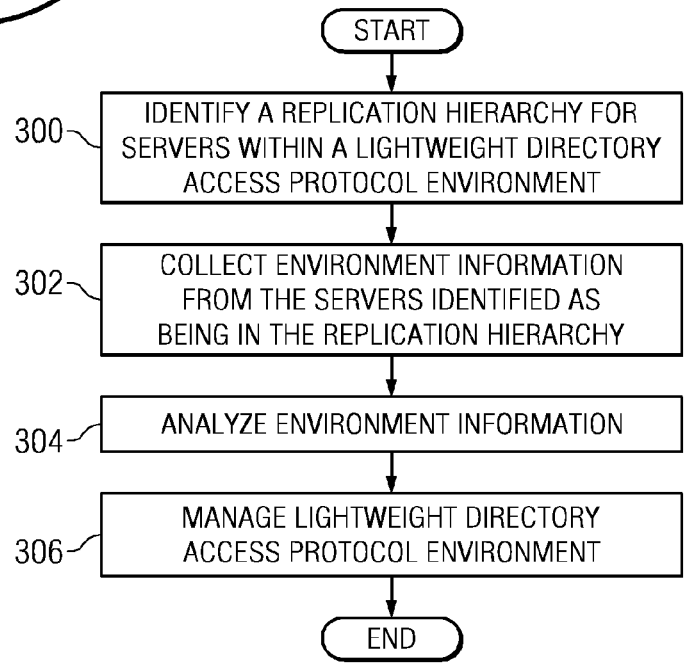
FIG. 3

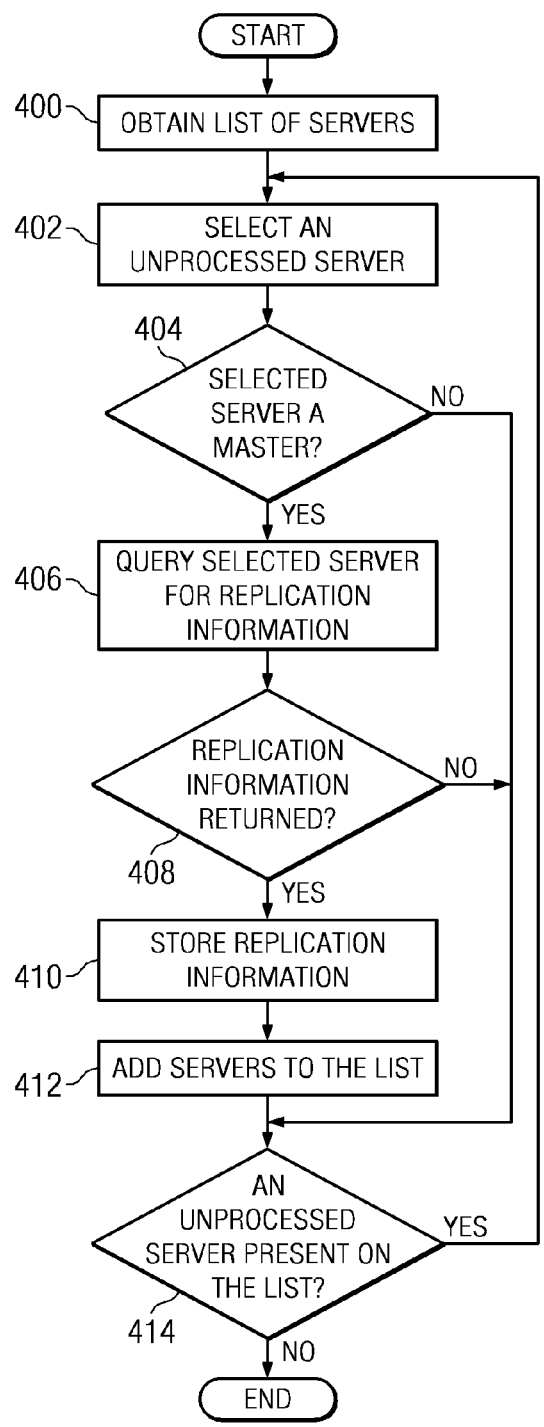
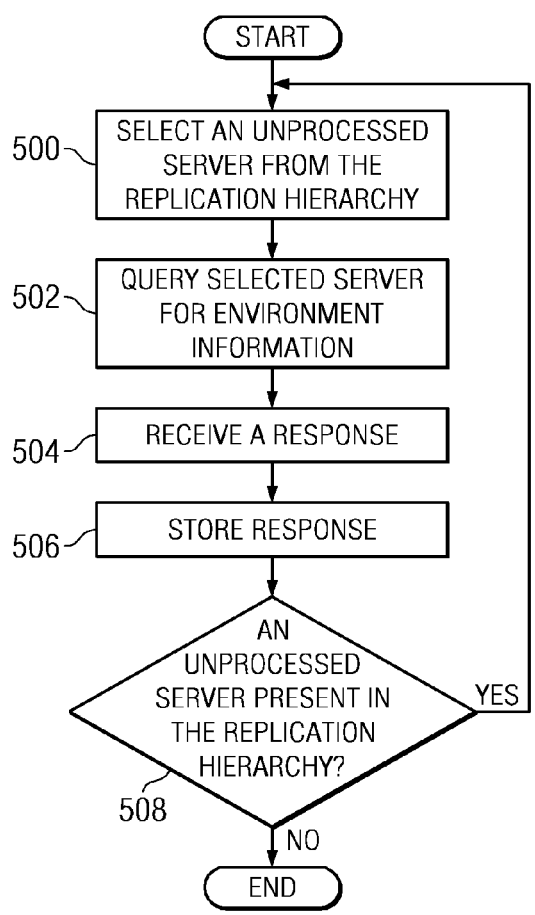

METHOD AND APPARATUS FOR MANAGING LIGHTWEIGHT DIRECTORY ACCESS PROTOCOL INFORMATION

BACKGROUND OF THE INVENTION

1. Field of the Invention

The present invention relates generally to an improved data processing system and in particular to a method and apparatus for processing data. Still more particularly, the present invention relates to a computer implemented method, apparatus, and computer usable program code for managing information used by lightweight directory access protocol environments.

2. Description of the Related Art

Lightweight directory access protocol (LDAP) is an application protocol used to query and modify directory services. A directory service is a software application or a set of software applications that store and organize information. This information may include, for example, information about network users and resources. Servers employing lightweight directory access protocol applications may search through directories in response to queries from a user and return results of the query to the user. For example, a user may search for all people located in Chicago whose name contains "David" that have an email address. The query for this search may request a return of a full name, email, title, and description. The results of this query may be returned to the user.

Further, lightweight directory access protocol services may be applied to other types of information. For example, a lightweight directory access protocol service may be used to search for information, such as, for example, encryption certificates, pointers to printers, applications of servers, and other services on a network.

Lightweight directory access protocol environments may be extremely large and complex to manage. These types of environments may be distributed over large geographic areas and usually contain numerous replicas.

In large environments, tasks, such as, maintaining consistent software levels, operating system levels, lightweight directory access protocol configurations, lightweight directory access protocol replication monitoring, hardware, and other system configurations that pertain to lightweight directory access protocol services, may become difficult to manage. Current processes for tracking server configurations are extremely cumbersome and require extensive manual data gathering. Oftentimes, personnel or users are required to go to the different computers on which the servers' applications are located on to verify information, such as, for example, operating system levels, configuration settings, hardware configurations, and replication settings.

This type of currently used process requires time and effort that increases as the number of servers increase and geographic area expands for a lightweight directory access protocol environment. Further, this manual process also may be error prone when relying on different users to identify all of the information needed to maintain and manage a lightweight directory access protocol environment.

SUMMARY OF THE INVENTION

The different embodiments provide a computer implemented method, apparatus, and computer usable program code for managing a lightweight directory access protocol environment. A replication hierarchy is identified for a plurality of lightweight directory access protocol servers within the lightweight directory access protocol environment by querying the plurality of lightweight directory access protocol servers for replication information. Environment information is collected for the plurality of lightweight directory access protocol servers using the replication hierarchy, wherein the environment information for the plurality of lightweight directory access protocol servers is used to manage the lightweight directory access protocol environment.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2 is a diagram of a data processing system in accordance with an illustrative embodiment;

FIG. 3 is a high-level flowchart of a process for managing a lightweight directory access protocol environment in accordance with an illustrative embodiment;

FIG. 4 is a flowchart of a process for identifying a replication hierarchy in accordance with an illustrative embodiment;

FIG. 5 is a flowchart of a process for collecting environment information in accordance with an illustrative embodiment;

DETAILED DESCRIPTION OF THE PREFERRED EMBODIMENT

Figure 1:
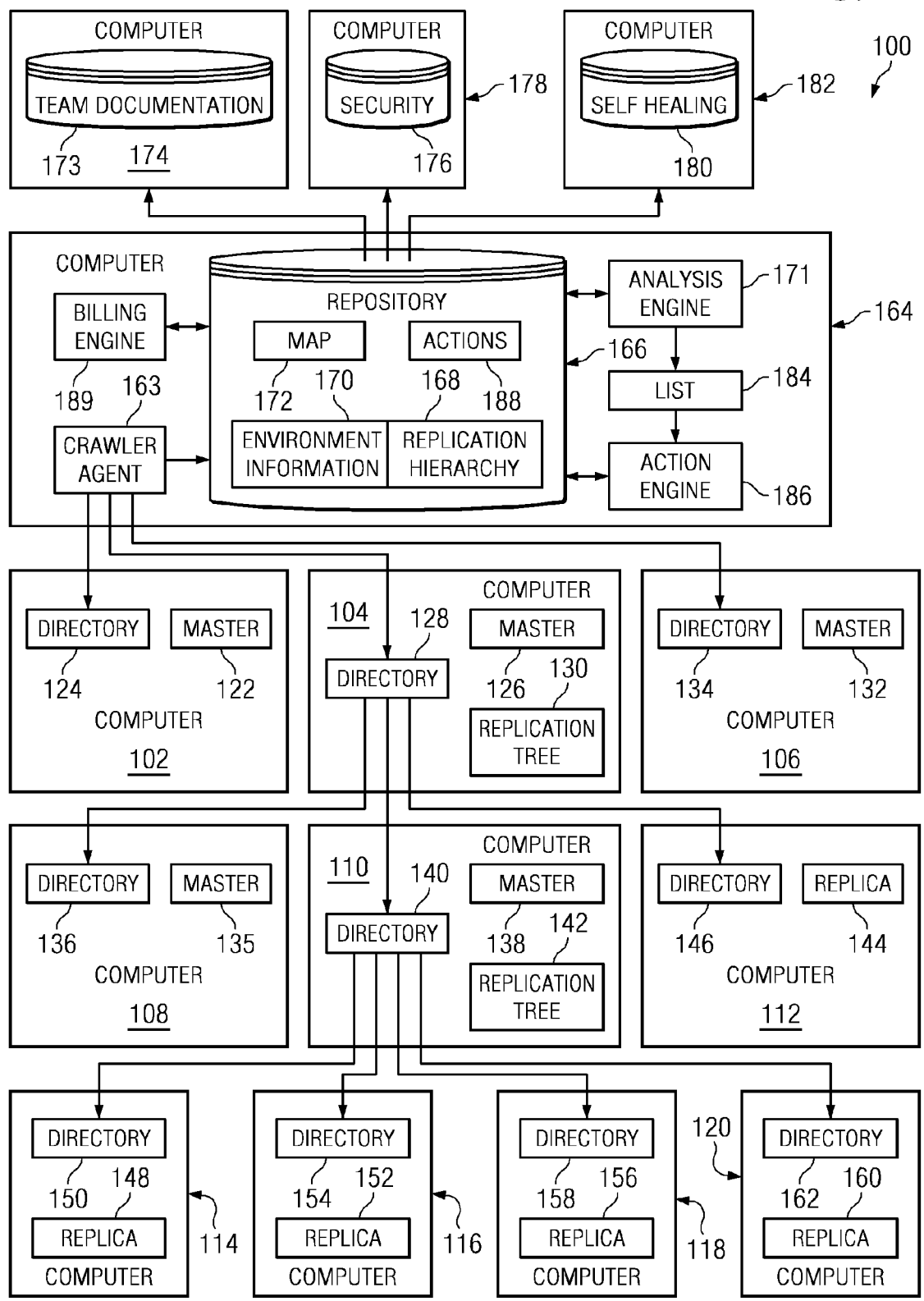
FIG. 1 is a diagram illustrating a lightweight directory access protocol environment in accordance with an illustrative embodiment.

With reference now to the figures and in particular with reference to FIG. 1, a diagram illustrating a lightweight directory access protocol environment is depicted in accordance with an illustrative embodiment. In this example, lightweight directory access protocol environment 100 contains computers 102, 104, 106, 108, 110, 112, 114, 116, 118, and 120. These computers provide hardware for lightweight directory access protocol servers. These servers are applications operating on the different depicted computers to provide access to databases in the form of directories. In the depicted examples, a directory is a specialized database optimized for reading, browsing, and searching data. Each directory contains a set of entries that may be arranged in a hierarchical tree-like structure. Each entry contains a collection of attributes that contain the information that may be searched for by users.

In these examples, a master is a lightweight directory access protocol server process that maintains or holds the original information for the directory. A replica is a lightweight directory access protocol server process that holds a copy of the information. These replicas are also referred to as shadowing or caching servers. A master may read and write data, while a replica may only read data from a directory.

In this example, computer 102 contains master 122 and directory 124. Computer 104 includes master 126 and directory 128. Additionally, computer 104 also includes replication tree 130. Replication tree 130 identifies the different lightweight directory access protocol servers that master 126 replicates to, updates information, and receives requests for changes.

As depicted, computer 106 contains master 132 and directory 134. Computer 108 contains master 135 and directory 136. Computer 110 contains master 138, directory 140, and replication tree 142, and computer 112 contains replica 144 and directory 146. Replica 148 and directory 150 are located on computer 114. Computer 116 contains replica 152 and directory 154. Computer 118 contains replica 156 and directory 158, and computer 120 contains replica 160 and directory 162.

In this example, master 126 provides replication services to master 135, master 138, and replica 144. Master 138 provides replication services to replica 148, replica 152, replica 156, and replica 160.

Each of these servers and the computers on which the servers execute may operate in different environments. For example, different computers on which the masters and replicas operate may have different types of hardware. Computer 102 may have one processor in a processor unit, while computer 104 may have three processors in a processor unit. Some computers may have heterogeneous processors, while other computers may only use homogeneous processors when multiple processors are present.

Also, different computers may use different types of operating systems. For example, computer 106 may contain a UNIX® operating system, while computer 108 may contain a Windows® server 2003 operating system. UNIX® is a registered trademark of the Open Group, and Windows® is a registered trademark of Microsoft Corporation.

Further, even when the same type of operating system is used, different levels may be present. In other words, within the same type of operating system, different patches or updates may have been installed on different computers. These updates are also referred to as fix packs.

Additional environment information found on these computers in lightweight directory access protocol environment 100 also may include the level or version of software for the different masters and replicas. Other non-limiting examples of environment information that may be used in managing lightweight directory access protocol environment 100 include the configuration of the different operating systems as well as the configuration of the master and replica server processes. Further examples also may include performance and load metrics, the number of network connections, the type of network connections, and the topology of the network connections.

The different illustrative embodiments recognize that the current methodology of collecting this and other type of information is extremely time consuming because a user, technician, or other person is currently required to manually gather this information from each of the computers on which lightweight directory access protocol servers are executing. The different illustrative embodiments also recognize that in many cases with large environments with this type of collection process, this information may be collected infrequently or not at all. Further, only limited amounts of information may be collected rather than the information actually needed to provide proper management of a lightweight directory access protocol environment.

Thus, the different illustrative embodiments provide a computer implemented method, apparatus, and computer usable program code for collecting environment information for lightweight directory access protocol servers, such as masters and replicas. In the different illustrative embodiments, a replication hierarchy for a plurality of servers is identified within lightweight directory access protocol environment 100 from querying lightweight directory access protocol servers within this environment for replication information. A replication hierarchy is an identification of which servers replicate from which servers. In these depicted examples, this replication information may be found in replication trees, such as replication trees 130 and 142. Environment information is collected for these servers using the replication hierarchy in which the environment information for these servers is used to manage lightweight directory access protocol environment 100.

In the different illustrative embodiments, an intelligent gathering engine or other software components, such as crawler agent 163 located on computer 164, may be employed to identify the replication hierarchy and collect environment information for the different lightweight directory access protocol servers located on computers 102, 104, 106, 108, 110, 112, 114, 116, 118 and 120. The environment information for a lightweight directory access protocol server may include information about the computer and other software on which the server is located as well as information about the server itself.

As described above, this information may include, for example, information about hardware, one or more operating systems, configuration information, performance and load information, and other software operating on the computer on which the server is located. The actual information collected by crawler agent 163 may vary, depending on the particular implementation.

In this example, master 122, master 126, and master 132 on computers 102, 104, and 106, respectively, are initially identified as computers on which a first level of servers in lightweight directory access protocol environment 100. In some examples, the first level may have only a single master. Crawler agent 163 may begin by querying the initially identified servers in lightweight directory access protocol environment 100. In this example, these servers are master 122, master 126, and master 132.

Based on this initial identification of servers, crawler agent 163 queries each of these servers to determine whether these servers provide replication services for other servers within lightweight directory access protocol environment 100. In this particular example, master 126 returns replication information from replication tree 130 to crawler agent 163. The replication information may include, for example, an identification of the server and an address for the server. Additional replication information that may be collected, includes, for example, pending replication numbers, total replication numbers, last successful replication object, and a status of the most current replication object. For this example, the replication information includes an identification of computers 108, 110, and 112.

Crawler agent 163 also determines whether the servers on these computers are masters or replicas. This identification is used to determine whether to query a particular server on a computer for replication information. Replicas, in these examples, are servers that only contain a copy or cached version of the information and do not provide any capability to modify information within a directory. As a result, these types of servers do not contain replication information and querying of these types of servers is unnecessary.

Computers 108 and 110 are identified as having masters 135 and 138. Computer 112 is identified as having replica 144. This identification may be made by querying the particular server located on each computer. Alternatively, if the information is provided within replication tree 130, such a query is unnecessary.

Crawler agent 163 then queries master 135 and master 138 to determine whether either of these servers contain replication information. Master 138 returns replication information from replication tree 142, in these examples, while master 135 does not return any replication information. Replication information from master 138 identifies computers 114, 116, 118, and 120 as computers containing servers for which master 138 provides replication services.

Crawler agent 163 determines whether masters or replicas are present on these computers. In this particular example, only replicas 148, 152, 156, and 160 are present. When no more masters are found, as in this example, the search for additional servers ends. The replication information forms the replication hierarchy in these examples.

Crawler agent 163 may transmit this information to repository 166 on computer 164. In this particular example, this information may be integrated locally within repository 166 as replication hierarchy 168. In other implementations, this information may be sent to a remote database. An example of a remote database that may be employed is a Tivoli® Change and Configuration Management Database available from Tivoli International Business Machines Incorporation. This type of database is used for storing information on configurations and change histories to integrate processes, information, and technology. In other implementations, this information may be sent in a format, such as extensible markup language (XML) in a readable format, for use in a service-oriented architecture. A service-oriented architecture is a collection of services that communicate with each other in which data may be passed from one service to another or to coordinate activities between one or more services. These services may be implemented with web services.

With the replication hierarchy identified, crawler agent 163 may make queries to obtain environment information for the identified masters and replicas. For example, this environment information may include, for example, operating system configurations, configurations of the lightweight directory access protocol server from the computer, software levels, performance and load information, hardware information, network connections, topology, and other information that may be useful in managing lightweight directory access protocol environment 100.

Crawler agent 163 stores this collected information as environment information 170 within repository 166, in these examples. With this information, human users and/or computer implemented methods may manage lightweight directory access protocol environment 100. For example, analysis engine 171 may generate map 172 using replication hierarchy 168. Map 172 is a visual map of the replication layout. This map may take the form of a tree structure that identified masters and replicas along the replication relationships between the different servers.

Map 172 may be stored within repository 166 or may be sent to other software components or storage locations for use. For example, map 172 may be distributed to team documentation 173 on computer 174, security 176 on computer 178, or self healing 180 on computer 182.

Further, analysis engine 171 also may include processes to analyze environment information 170 to identify problems or potential problems. Some non-limiting examples of problems that may be identified by analysis engine 171 include a presence of different operating system levels or fix packs, different software installed, different software levels, or different fix packs.

Other non-limiting examples include different configuration parameters being present on different servers. For example, differences may be present in different replication agreements and credentials. Differences between internal computer resources may result from different values for performance tuning parameters. These resources include, for example, memory, processor allocation, and other hardware resources. Operating system level tuning parameters may be set to adjust performance and may be configured differently on different computers. If these parameters are not tuned properly, replication could be slow and cause end users to experience problems accessing applications that authenticate though Lightweight Directory Access Protocol.

Additionally, database configuration parameters also may be different. Every lightweight directory access protocol server system has a copy of the database and its own configuration for the server system stored in this database. In order for lightweight directory access protocol replication to have the best performance, each database internal configuration may be configured and/or optimized. Some illustrative examples are the number of processors registered to the database software, maintenance schedules for the database software for optimization of data access, and I/O database configuration settings. Another problem that may be identified by analysis engine 171 is mismatched or unbalanced loads.

These problems may be stored in list 184 and passed to action engine 186. In these examples, action engine 186 may identify steps, which may be automatically performed to remedy a situation from actions 188. Alternatively, actions 188 may include an identification of users or groups that should receive notification to resolve the problem.

For example, action engine 186 may send a notification to security 176 or team documentation 173. The problem may be sent to self healing 180 to initiate an automatic process to fix a problem. For example, an incorrect operating system level or fix pack identification may be sent to self healing 180 on computer 182. In response, self healing 180 may initiate a process on the computer having the incorrect operating system level or fix pack to change the operating system level or install the fix pack.

Further, environment information 170 may be used by billing engine 189 to charge appropriate businesses, organizations, internal groups, or other entities for actions that may be needed to manage lightweight directory access protocol environment 100. In particular, the billing may be performed for specific actions needed to resolve problems that are identified. The entity to be billed may be identified using environment information 170. This environment information may include, for example, an Internet Protocol (IP) address associated with a particular application. The IP address may be used to identify the entity or business unit.

Turning now to FIG. 2, a diagram of a data processing system is depicted in accordance with an illustrative embodiment. In this illustrative example, data processing system 200 includes communications fabric 202, which provides communications between processor unit 204, memory 206, persistent storage 208, communications unit 210, input/output (I/O) unit 212, and display 214. Data processing system 200 is an example of a computer that may be used to implemented computers in lightweight directory access protocol environment 100 in FIG. 1.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip.

As another illustrative example, processor unit 204 may be a symmetric multi-processor system containing multiple processors of the same type.

Memory 206, in these examples, may be, for example, a random access memory. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as computer usable program code or computer readable program code that may be read and executed by a processor in processor unit 204. The computer readable program code may be embodied on different physical or tangible computer readable media, such as memory 206 or persistent storage 208.

Computer usable program code 216 is located in a functional form on computer readable media 218 and may be loaded onto or transferred to data processing system 200. Computer usable program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive or a flash memory that is connected to data processing system 200.

Alternatively, computer usable program code 216 may be transferred to data processing system 200 from computer readable media 218 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

For example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The depicted illustration of different components used to collect information about the hierarchy of servers on different computers within lightweight directory access protocol environment 100 in FIG. 1 and environment information for these different servers are not meant to imply architectural limitations in the manner in which different illustrative embodiments may be implemented. For example, billing engine 189, analysis engine 171, and action engine 186 in FIG. 1 may be implemented as a single software component. The different components illustrated in these examples are presented as functional components. In other embodiments, these components may be located on different computers other than computer 164 in FIG. 1. In other implementations, crawler agent 163 in FIG. 1 may query different computers for environment information while replication information is still being retrieved.

Turning now to FIG. 3, a high-level flowchart of a process for managing a lightweight directory access protocol environment is depicted in accordance with an illustrative embodiment. The process illustrated in FIG. 3 may be implemented in lightweight directory access protocol environment 100 in FIG. 1 in these examples. In these examples, crawler agent 163 in FIG. 1 identifies a replication hierarchy of lightweight directory access protocol servers within lightweight directory access protocol environment 100 (step 300). Step 300 may be performed as a series of steps in which an initial set of lightweight directory access protocol servers are queried for the replication information. The initial set of lightweight directory access protocol servers is one or more lightweight directory access protocol servers. The replication information obtained from these servers identifies additional servers in lightweight directory access protocol environment 100 and is used for more queries. This query process continues until no more servers are discovered.

Thereafter, crawler agent 163 collects environment information from lightweight directory access protocol servers identified as being in the replication hierarchy (step 302). Next, analysis engine 171 in FIG. 1 analyzes the environment information (step 304). Step 304 results in an analysis, such as list 184 in map 172 in FIG. 1. Action engine 186 in FIG. 1 may then manage the lightweight directory access protocol environment (step 306) with the process terminating thereafter.

Turning now to FIG. 4, a flowchart of a process for identifying a replication hierarchy is depicted in accordance with an illustrative embodiment. The process illustrated in FIG. 4 may be implemented in a software component, such as crawler agent 163 in FIG. 1.

The process begins with crawler agent 163 obtaining a list of servers (step 400). This list of servers may be an initial list of lightweight directory access protocol servers identified for the lightweight directory access protocol environment. The list may be one or more servers depending on the architecture implemented in the environment. The list is initially a list of the top-level servers for lightweight directory access protocol environment 100 in FIG. 1.

Crawler agent 163 then selects an unprocessed server from the list for processing (step 402). Crawler agent 163 determines whether the selected server is a master (step 404). In these examples, a determination may be made by querying the server on the computer. Alternatively, the list also may include an identification of the type of server present. The first time step 402 is encountered, each server on the list is a master server. When replication information is identified for the replication hierarchy, these subsequent servers at lower levels may include both masters and replicas.

If the server is a master, crawler agent 163 queries the selected server for replication information (step 406). Next, a determination is made as to whether replication information is returned (step 408). If replication information is returned, crawler agent 163 stores the returned replication information (step 410). In storing the replication information, crawler agent 163 also stores an identification of the server returning the replication information. This association may be used to generate a map of the replication hierarchy.

Next, crawler agent 163 adds the servers identified in the replication information to the list (step 412). Thereafter, crawler agent 163 determines whether an unprocessed server is present on the list (step 414). If an unprocessed server is present on the list, the process returns to step 402 to select an unprocessed server for processing. Otherwise, the process terminates. With reference again to step 408, if replication information is not returned, the process proceeds to step 414. The process also proceeds to step 414 from step 404, if crawler agent 163 determines that the selected server is not a master server.

Turning next to FIG. 5, a flowchart of a process for collecting environment information is depicted in accordance with an illustrative embodiment. The process in FIG. 5 may be implemented in a software component, such as crawler agent 163 in FIG. 1.

The process begins with crawler agent 163 selecting an unprocessed server from the replication hierarchy (step 500). This replication hierarchy is the replication hierarchy stored by crawler agent 163 during the process illustrated in FIG. 4. Crawler agent 163 queries the selected server for environment information (step 502). Crawler agent 163 may make queries directly to software components or firmware already present on the computer through currently available interfaces. In other embodiments, the query may be to a single agent or module located on the computer on which the selected server is located. This agent or module is responsible for collecting environment information for use in managing the lightweight directory access protocol environment.

Crawler agent 163 may query the server to identify environment information, such as the configuration of the server, the level of the software for the server, and fix packs applied to the server. As another example, crawler agent 163 may make calls to the operating system on the computer to obtain other environment information, such as an identification of hardware present on the computer, information about the operating system, and information about other software that may be present on the computer.

Thereafter, crawler agent 163 receives a response to the query (step 504). Typically, the response is the environment information corresponding to the query. In some cases, the response may be an absence of information or an error. In these examples, the query made in step 502 is a set of queries. This query may be, for example, multiple queries made to different components within the computer on which the server is located.

Crawler agent 163 then stores the response (step 506). Next, crawler agent 163 determines whether an unprocessed server is present in the replication hierarchy (step 508). If an unprocessed server is present, the process returns to step 500. Otherwise, the process terminates.

Figure 6:
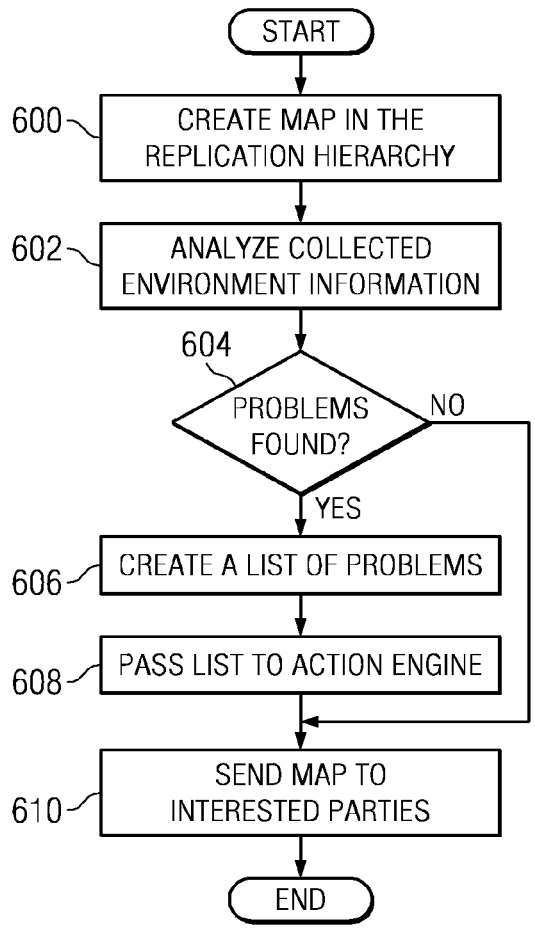
FIG. 6 is a flowchart of a process for analyzing environment information in accordance with an illustrative embodiment.

Turning now to FIG. 6, a flowchart of a process for analyzing environment information is depicted in accordance with an illustrative embodiment. The process illustrated in FIG. 6 may be implemented in a software component, such as analysis engine 171 in FIG. 1.

The process begins with analysis engine 171 creating a map, such as map 172 in FIG. 1, in the replication hierarchy (step 600). The map created in step 600 is a visual map of the replication layout, which may be used by different users in additional analyses or management of the lightweight directory access protocol environment.

Analysis engine 171 then analyzes the collected environment information (step 602). In these examples, the analysis may be made by comparing values for different parameters' configurations across the different servers. Differences in these values may be identified as potential issues or problems. Another example of an analysis that may be made in step 602 is a comparison of the environmental information collected from the different servers with a baseline or set of standards for the environment information. For example, the standard or baseline may require that a selected set of patches or fix packs be installed for a particular type of operating system. Analysis engine 171 may perform this analysis using a policy. In these examples, the policy is a set of one or more rules used to process or analyze the environment information.

Next, analysis engine 171 determines whether problems were found (step 604). If one or more problems have been found in the analysis, a list of problems, such as list 184 in FIG. 1, is created (step 606). Thereafter, this list is passed to action engine 186 for processing (step 608). The process then sends the map to interested parties (step 610) with the process terminating thereafter. With reference again to step 604, if problems are not found, analysis engine 171 proceeds to step 610 as described above.

Figure 7:
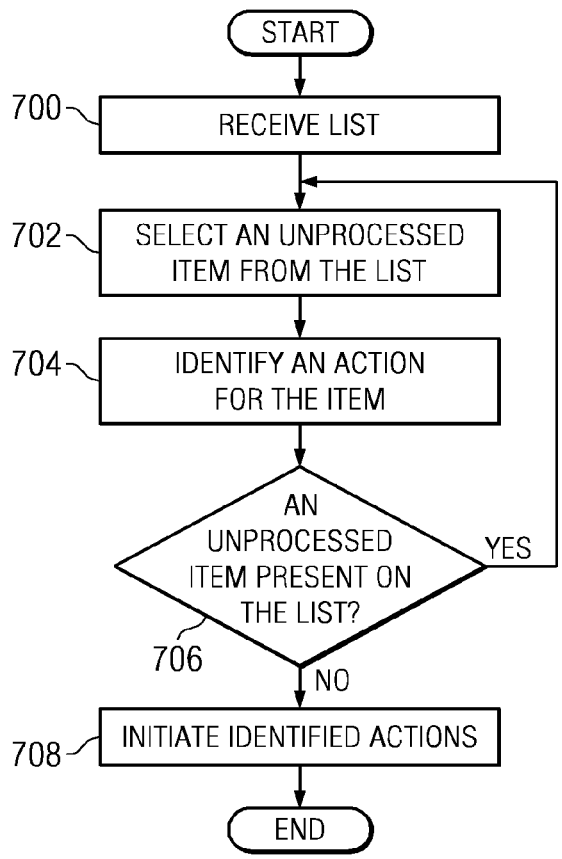
FIG. 7 is a flowchart of a process for managing a lightweight directory access protocol environment in accordance with an illustrative embodiment.

Turning now to FIG. 7, a flowchart of a process for managing a lightweight directory access protocol environment is depicted in accordance with an illustrative embodiment. The process illustrated in FIG. 7 may be implemented using a software component, such as action engine 186 in FIG. 1.

The process begins with action engine 186 receiving a list of problems, such as list 184 in FIG. 1, (step 700). Action engine 186 selects an unprocessed item from the list (step 702). Action engine 186 identifies an action for the selected item (step 704). This identification may be, for example, initiating an automatic process or software component to fix or resolve the problem. In other examples, this action may be to send a notification to an appropriate person or group to resolve the problem.

Thereafter, action engine 186 determines whether an unprocessed item is present on the list (step 706). If an unprocessed item is present, the process returns to step 702 as described above. Otherwise, action engine 186 initiates the identified action (step 708) with the process terminating thereafter.

Thus, the different illustrative embodiments provide a computer implemented method, apparatus, and computer usable program code for managing a lightweight directory access protocol environment. The different embodiments identify a replication hierarchy for servers within the lightweight directory access protocol environment from querying servers for replication information. Environment information is collected from the servers using the replication hierarchy. This environment information may then be used to manage the environment.

In this manner, the different illustrative embodiments provide an ability to gather information about the hierarchy or structure of replications occurring within a lightweight directory access protocol environment. Further, the different embodiments also provide an ability to reduce the cumbersomeness and time needed to collect and analyze information as currently performed by users. The different illustrative embodiments provide for more centralized collection analysis information. Further, with the different embodiments, data may be updated in a much more or closer to real time fashion. This type of collection of information using a crawler agent also reduces the time needed to track down and verify settings. Further, through using the crawler agent, the analysis engine, and the action engine, management of the lightweight directory access protocol environment may be made in a quicker fashion as compared to currently used methods. Further, the different advantageous embodiments allow for an ability to identify businesses, organizations, or other entities for purposes of charging for services needed to correct problems that are identified.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can store the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may store a computer readable program code such that when the computer readable program code is executed on a computer, the execution of this computer readable program code causes the computer to transmit another computer readable program code over a communications link.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing a plurality of lightweight directory access protocol servers utilizing a lightweight directory access protocol within a lightweight directory access protocol environment, the computer implemented method comprising:
   a computer identifying a replication hierarchy for the plurality of lightweight directory access protocol servers within the lightweight directory access protocol environment by
   querying one of the lightweight directory access protocol servers for a list of other lightweight directory access protocol servers replicated by the one lightweight directory access protocol server; and
   querying the other lightweight directory access protocol servers for other respective lists of lightweight directory access protocol servers replicated by said other lightweight directory access protocol servers replicated by said one lightweight directory access protocol server;
   based on the list of other lightweight directory access protocol servers replicated by the one lightweight directory access protocol server and the other respective lists of lightweight directory access protocol servers replicated by said other lightweight directory access protocol servers replicated by the one lightweight directory access protocol server, the computer collecting configuration information for the other lightweight directory access protocol servers replicated by the one lightweight directory access protocol server and the lightweight directory access protocol servers replicated by said other lightweight directory access protocol servers replicated by the one lightweight directory access protocol server; and
   the computer managing the lightweight directory access protocol environment using the configuration information by identifying an action to be performed based on the configuration information and initiating the action.

2. The computer implemented method of claim 1, wherein the managing step comprises:
   identifying differences in the configuration information for the plurality of lightweight directory access protocol servers; and
   determining whether any difference in the differences identified in the configuration information requires a change to improve performance in the lightweight directory access protocol environment.

3. The computer implemented method of claim 2, wherein the step of identifying the differences in the configuration information for the plurality of lightweight directory access protocol servers comprises:
   comparing the configuration information from one server in the plurality of lightweight directory access protocol servers with a policy.

4. The computer implemented method of claim 2, wherein the determining step comprises:

determining whether any difference in the configuration information requires a change to reduce issues with replicating data in the lightweight directory access protocol environment.

5. The computer implemented method of claim 2 further comprising:
identifying an action to improve the performance in the lightweight directory access protocol environment to form an identified action; and
initiating the identified action.

6. The computer implemented method of claim 5, wherein the initiating step comprises:
initiating a selected computer implemented process to cause the change to improve the performance in the lightweight directory access protocol environment.

7. The computer implemented method of claim 5, wherein the initiating step comprises:
sending a notification to a user identifying the change.

8. The computer implemented method of claim 1, wherein the configuration information comprises at least one of hardware, software, operating system configuration, lightweight directory access protocol server configuration, installed fix packs, network connections, load information and performance information.

9. A computer program product for managing a plurality of lightweight directory access protocol servers utilizing a lightweight directory access protocol within a lightweight directory access protocol environment, the computer program product comprising:
a computer-readable, tangible storage device;
first program instructions to identify a replication hierarchy for the plurality of lightweight directory access protocol servers within the lightweight directory access protocol environment by querying one of the lightweight directory access protocol servers for a list of other lightweight directory access protocol servers replicated by the one lightweight directory access protocol server; and
querying the other lightweight directory access protocol servers for other respective lists of lightweight directory access protocol servers replicated by said other lightweight directory access protocol servers replicated by said one lightweight directory access protocol server;
second program instructions to collect configuration information for the other lightweight directory access protocol servers replicated by the one lightweight directory access protocol server and the lightweight directory access protocol servers replicated by said other lightweight directory access protocol servers replicated by the one lightweight directory access protocol server based on the list of other lightweight directory access protocol servers replicated by the one lightweight directory access protocol server and the other respective lists of lightweight directory access protocol servers replicated by said other lightweight directory access protocol servers replicated by the one lightweight directory access protocol server; and
third program instructions to manage the lightweight directory access protocol environment using the configuration information by identifying an action to be performed based on the configuration information and initiating the action;
wherein the first, second and third program instructions are stored on the computer-readable tangible storage device.

10. The computer program product of claim 9, wherein the third program instructions comprises:

identification program instructions to identify differences in the configuration information for the plurality of lightweight directory access protocol servers; and
determination program instructions to determine whether any difference in the differences identified in the configuration information requires a change to improve performance in the lightweight directory access protocol environment.

11. The computer program product of claim 10, wherein the identification program instructions comprises:
comparison instructions stored on the computer readable medium to compare the configuration information from one server in the plurality of lightweight directory access protocol servers with a policy.

12. The computer program product of claim 10, wherein the determination program instructions comprises:
subprogram instructions to determine whether any difference in the configuration information requires a change to reduce issues with replicating data in the lightweight directory access protocol environment.

13. The computer program product of claim 10 further comprising:
fifth program instructions to identify an action to improve the performance in the lightweight directory access protocol environment to form an identified action; and
sixth program instructions to initiate the identified action, wherein the fifth program code and the sixth program code are stored on the computer readable storage medium.

14. A data processing system for managing a plurality of lightweight directory access protocol servers utilizing a lightweight directory access protocol within a lightweight directory access protocol environment, the data processing system comprising:
a central processing unit (CPU), a computer readable memory and a computer-readable tangible storage device;
first program instructions to identify a replication hierarchy for the plurality of lightweight directory access protocol servers within the lightweight directory access protocol environment by querying one of the lightweight directory access protocol servers for a list of other lightweight directory access protocol servers replicated by the one lightweight directory access protocol server; and
querying the other lightweight directory access protocol servers for other respective lists of lightweight directory access protocol servers replicated by said other lightweight directory access protocol servers replicated by said one lightweight directory access protocol server;
second program instructions to collect configuration information for the other lightweight directory access protocol servers replicated by the one lightweight directory access protocol server and the lightweight directory access protocol servers replicated by said other lightweight directory access protocol servers replicated by the one lightweight directory access protocol server based on the list of other lightweight directory access protocol servers replicated by the one lightweight directory access protocol server and the other respective lists of lightweight directory access protocol servers replicated by said other lightweight directory access protocol servers replicated by the one lightweight directory access protocol server; and
third program instructions to manage the lightweight directory access protocol environment using the configuration information by identifying an action to be performed based on the configuration information and initiating the action; and wherein the first, second and third program instructions are stored on the computer-readable tangible storage device for execution by the CPU via the computer readable memory.

15. The data processing system of claim 14, wherein the third program instructions comprises:

instructions to identify differences in configuration information for the plurality of lightweight directory access protocol servers; and instructions to determine whether any difference in the differences identified in the configuration information requires a change to improve performance in the lightweight directory access protocol environment.

* * * * *